United States Patent [19]

Byard

[11] Patent Number: 5,383,639
[45] Date of Patent: Jan. 24, 1995

[54] APPARATUS FOR SECURING A SHOPPING CART

[76] Inventor: Robert B. Byard, 1134 Brown St., Ste. 2F, Akron, Ohio 44301

[21] Appl. No.: 911,519

[22] Filed: Jul. 10, 1992

[51] Int. Cl.⁶ ............................................. A47B 91/12
[52] U.S. Cl. ................................. 248/346.1; 156/71; 188/32
[58] Field of Search ............. 156/71; 248/346.1, 352; 188/4 R, 32

[56] References Cited

U.S. PATENT DOCUMENTS

| | | | |
|---|---|---|---|
| 1,480,758 | 1/1924 | Hight | 248/346.1 |
| 2,018,264 | 10/1935 | Jones | 248/346.1 |
| 2,465,551 | 3/1947 | Otterness | |
| 2,787,085 | 4/1957 | Auer | 248/346.1 |
| 2,931,463 | 4/1960 | Stansbury | 248/346.1 |
| 3,065,680 | 11/1962 | Wiedman | |
| 3,138,893 | 6/1964 | Rupar | 248/346.1 |
| 3,391,760 | 7/1968 | Gonser | |
| 3,459,280 | 1/1968 | Grimm | |
| 3,896,059 | 7/1975 | Wakefield et al. | 152/537 X |
| 4,120,384 | 10/1978 | Choy | 188/32 |
| 4,153,245 | 5/1979 | McCoy | 273/1 R |
| 4,594,021 | 6/1986 | Schäfer et al. | 404/6 X |
| 4,679,818 | 7/1987 | Kakavas | 188/32 X |
| 5,046,587 | 9/1991 | Jones | 248/346.1 X |
| 5,069,311 | 12/1991 | Young | 188/32 |
| 5,210,903 | 5/1993 | Horning | 248/352 |

*Primary Examiner*—Mark A. Osele
*Attorney, Agent, or Firm*—Roger D. Emerson

[57] ABSTRACT

An apparatus for securing a wheeled cart to a specific location in a parking lot comprises an elastomeric body member the body member has a top surface which includes inclined surfaces and the depression. Corner shoulders feature rounded outwardly facing surfaces and help direct swiveled wheels of shopping carts away from the corners and up the inclined surfaces into the depression. The body member is attached to the packing lot surface by means of butyl rubber mastic adhesive. The inclined surfaces can include slots to remove water from the depression.

4 Claims, 5 Drawing Sheets

APPARATUS FOR SECURING A SHOPPING CART

BACKGROUND OF THE INVENTION

1. Field of Invention

This invention relates generally to apparatus for securing wheeled vehicles to certain locations on a floor or ground surface, and more specifically to an apparatus to be mounted in asphalt parking lots to prevent unmanned shopping cares from rolling freely and colliding with and damaging vehicles parked within the parking lot.

2. Description of Related Art

U.S. Pat. No. 3,459,280 to Grimm discloses a boundary barrier for preventing removal of wheeled carts, such as shopping carts, from a specific area. The boundary barrier consists of a grid wherein the vehicle-wheel traps 12 are spaced apart a certain distance to receive wheels 18 from the vehicle 14.

U.S. Pat. No. 4,120,384 to Choy discloses a shopping cart braking apparatus designed to prevent removal of shopping carts from parking lots of supermarkets. The apparatus comprises braking surface 1 which cooperates with specially designed swivel wheels 3 on a shopping cart 2.

U.S. Pat. No. 4,679,818 to Kakavas discloses a display table attachment for shopping carts. The attachment is designed to be utilized with a display table such as is found in retail outlets and high volume food marts. The table is configured to be raised above a floor surface to an optimum height for passers-by to view an associated shopping cart.

As is seen from a review of the related art discussed above, there remained a need for a simple device which could be conveniently located in parking lots and which could effectively secure wheeled shopping carts in a specific location.

Frequently, after a shopper has emptied their shopping cart into the trunk of their vehicle, the shopping cart is allowed to roll freely across the parking lot and collide with parked vehicles. Often, owners of these damaged vehicles seek compensation from the store. For many stores, compensation for such incidental damage to parked vehicles amounts to several thousand dollars per year.

Applicant has developed an inexpensive yet effective solution to this problem.

The present invention contemplates a new and improved apparatus for securing shopping carts at a location within a parking lot. The invention is simple in design, effective in use, and overcomes the foregoing difficulties and others while providing better and more advantageous overall results.

SUMMARY OF THE INVENTION

In accordance with the present invention, a new and improved apparatus for securing a shopping cart is provided.

More particularly, in accordance with the invention, the apparatus includes a body member having a top surface and a bottom surface. The top surface has an outside edge, a top edge, and an inclined surface. The inclined surface extends between the outside edge and the top edge of the top surface. The inclined surface has a top and the top edge of the top surface define a depression. Corner shoulders are located on the inclined surface and are elevated therefrom. Outward-facing surfaces of the corner shoulders are rounded. The depression has a floor which comprises a portion of the bottom surface of the body member which extends beneath said depression. An adhesive is applied to the bottom surface of the body member. The adhesive is a butyl rubber mastic adhesive. The body member is made of an elastomer, and is preferably made of over aged tire tread rubber or recycled tires.

According to a further aspect of the invention, a method of anchoring a shopping cart in a parking lot comprises the steps of choosing an anchoring point where the shopping carts are to be gathered; mounting an apparatus to a parking lot surface at the anchoring point, the apparatus having an inclined surface and a securing means for securing wheels of shopping carts within the apparatus; and, rolling a shopping cart to the apparatus and up the inclined surface until a wheel of the shopping cart is secured by the securing means.

One advantage of the present invention is the provision of a new apparatus which is effective to secure shopping carts at desired locations within parking lots.

Another advantage of the invention is the provision of a butyl rubber mastic adhesive which cooperates with the apparatus to secure it to the parking lot surface without damaging the parking lot surface. Because the adhesive contains no petroleum distillates, no damage is done to the parking lot surface while the apparatus is securely affixed thereto.

Another advantage of the invention is the provision of a body member made of an elastomer. The body member is preferably made of recycled rubber. The recycled rubber can be of uncured, over aged, tire tread stock or of shredded, recycled tires.

Another advantage of the present invention is the provision of rounded outward-facing surfaces on the corner shoulders. The rounded outward-facing surfaces decrease the likelihood of a snow plow lifting the inventive apparatus from the parking lot surface during wintertime plowing.

Another advantage of the invention is the provision of corner shoulders which are elevated above the inclined surfaces. The corner shoulders help direct the swivelled wheels of shopping carts to the inclined surface and up into the depression where the wheels can be secured.

Another advantage of the invention is the provision of a drainage slot in the inclined surfaces to allow water, snow, and ice accumulating in the depression to be drained therefrom.

Still another advantage of the invention is the provision of an apparatus usable by store employees which, while not harming the parking lot surface, is effective in retaining stray and errant shopping carts to preferred, desired locations within the parking lot. The ability to gather and secure shopping carts at such locations greatly reduces, if not eliminates, the expenditures for broken or damaged shopping cares and vehicles.

Still other benefits and advantages of the invention will become apparent to those skilled in the art to which it pertains upon a reading and understanding of the following detailed specification.

For the convenience of the reader, the following correlation between reference numbers and elements of the invention is provided:

A—Apparatus
10—Body Member
12—Top Surface of Body Member
14—Bottom Surface of Body Member
20—Inclined Surfaces
26—Corner Shoulders
28—Outward-Facing Surfaces of Corner Shoulders
34—Wheels
40—Depression
44—Depression Side Wall
46—Top Edge
48—Outside Edge
50—Depression Floor
54—Slot
60—Butyl Rubber Mastic Adhesive
66—Parking Lot Surface
70—Circle
74—Parking Lot Line
76—Parking Lot Line
80—Shopping Carts
82—Vehicle
92—Parking Space
94—Parking Space
96—Parking Space
98—Parking Space

DESCRIPTION OF THE PREFERRED EMBODIMENT

Figure 1:
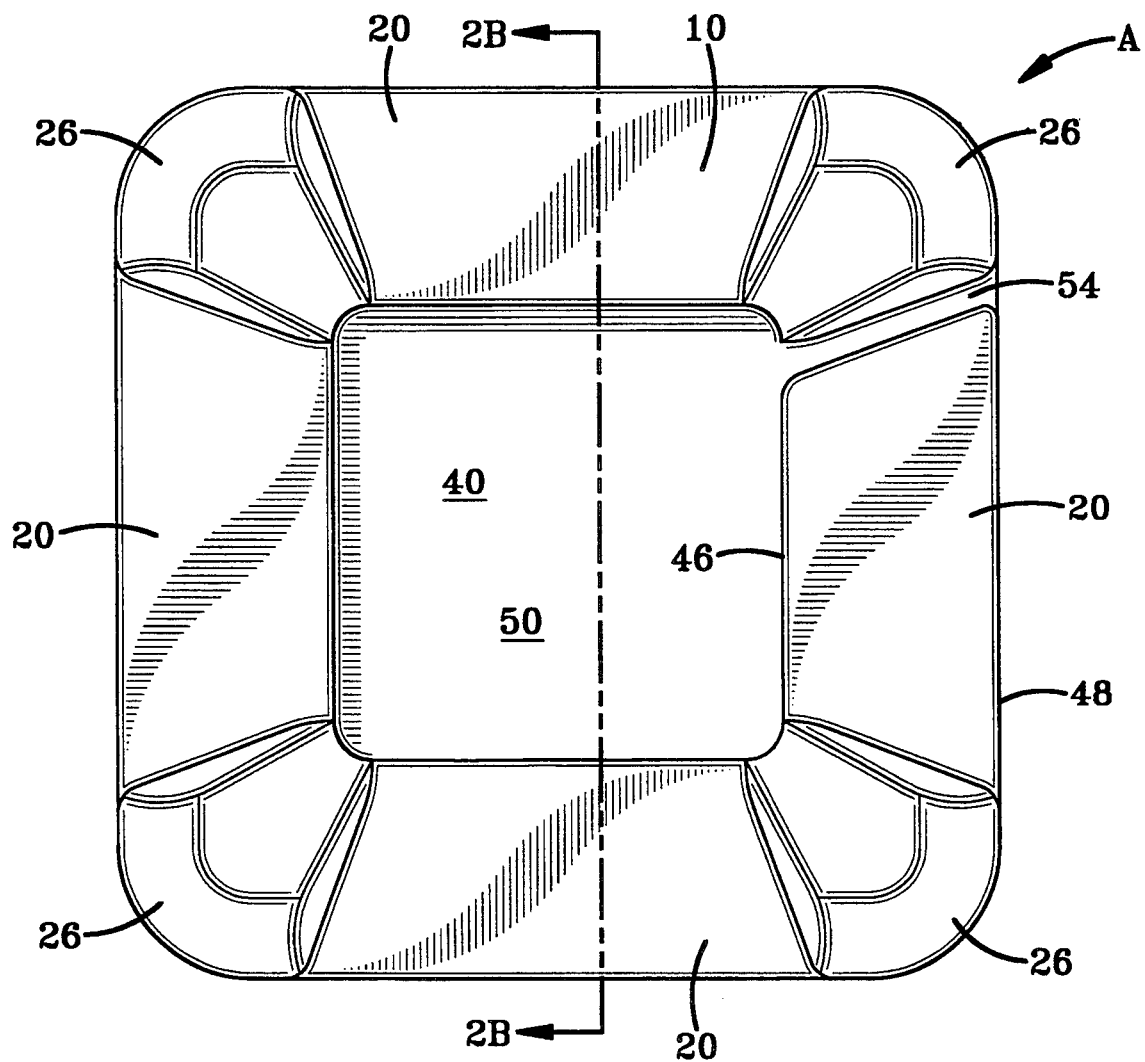
FIG. 1 is a top view of an apparatus according to the invention.
Figure 2A:
FIG. 2 is a side elevational view of an apparatus according to the invention.
FIG. 2B is a cross-sectional view of an apparatus according to the invention, the cross-section taken along line 2B—2B of FIG. 1.
Figure 2B:
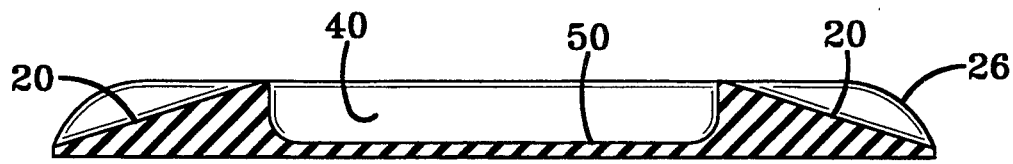
Figure 3:
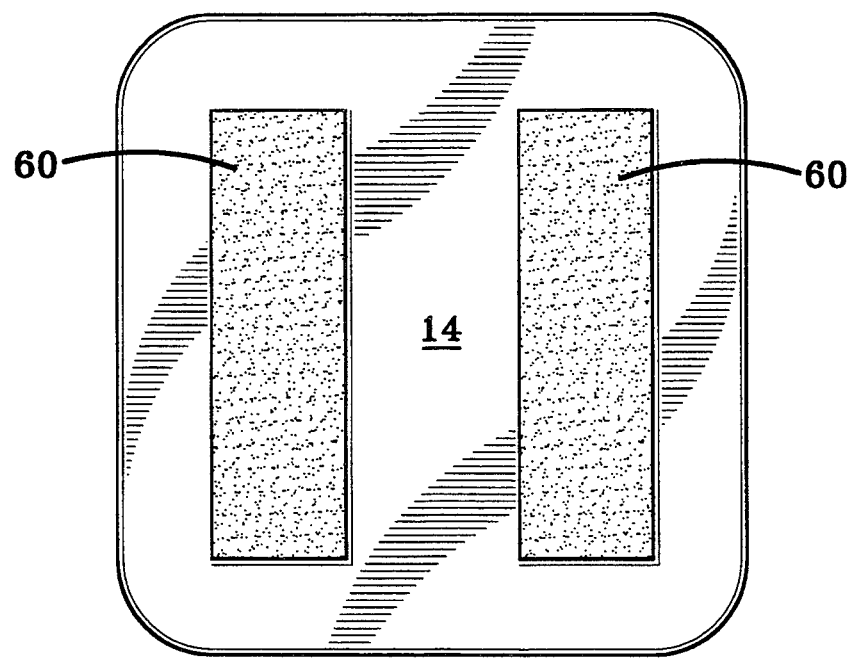
FIG. 3 is a bottom view of an apparatus according to the invention.

Referring now to the drawings wherein the showings are for purposes of illustrating a preferred embodiment of the invention only and not for purposes of limiting the same, FIGS. 1 and 2 show the inventive apparatus A. The apparatus has a top surface 12 and a bottom surface 14. The body member 10 has a top edge 46 and an outside edge 48.

The top surface 12 comprises inclined surfaces 20. In the preferred embodiment, the apparatus A has a square footprint and features four inclined surfaces 20. However, it is not necessary that the apparatus A be square, nor that the apparatus A has four inclined surfaces 20, to be effective. For example, the body member 10 could also be round. The inclined surfaces 20 make an incline of between 10° and 75° with a plane containing the bottom surface 14 of the body member 10. In the preferred embodiment, the inclined surface 20 makes an angle of 20° with a plane containing the bottom surface 14. In the preferred embodiment, the length of the inclined surface 20 is 1.5 inches while its height above the parking lot surface is 0.5 inches.

Rising from the inclined surfaces 20 are corner shoulders 26. As is best seen in FIG. 2, the corner shoulders 26 have an outward-facing surface 28 which is rounded. The rounded outer surface 28 is helpful in directing swiveled wheels 34 of shopping carts into the inclined surfaces 20 and are also effective in preventing snow removal equipment such as the blades of snow plows from lifting the body member 10 from the parking lot surface.

Figure 4:
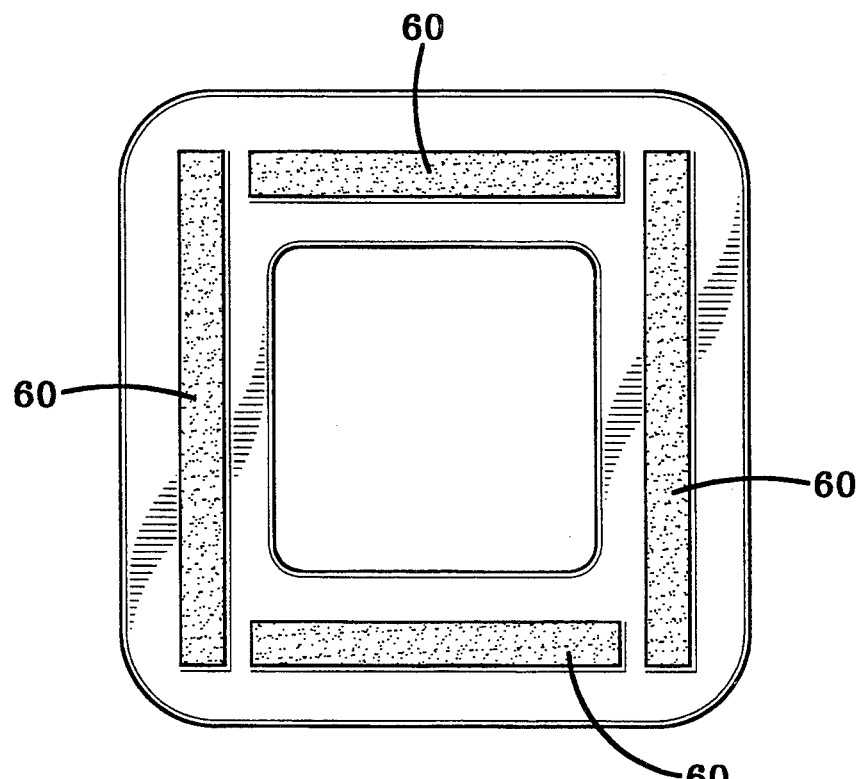
FIG. 4 is a bottom view of an apparatus according to the invention, showing the location of butyl rubber mastic adhesive strips.

In the center of the body member 10 is a depression 40. The depression 40 is defined by vertically downward extending depression side walls 44 which extend downwardly from a top edge 46 of the top surface 12 of the body member 10. With reference to FIG. 4, in the preferred embodiment, the body member 10 has a depression floor 50. In an alternate embodiment, the depression 40 has no floor but instead is open, so that the body member 10 resembles an annulus or donut. This embodiment may have advantages in some applications due to improved drainage but may be more expensive to produce. With reference again to FIGS. 1 and 2, if the body member 10 is constructed so that the depression 40 has a depression floor 50, a slot 54 can be included in one or more of the inclined surfaces 20 to allow water accumulating within the depression 40 to escape.

With reference to FIG. 4, the body member 10 is preferably secured to the parking lot surface by securing means. In the preferred embodiment, the securing means comprises butyl rubber mastic adhesive 60. The preferred adhesive is available from Patch Rubber, a division of Myers Tire Supply of Akron, Ohio. Butyl rubber mastic adhesive is preferred because it contains no petroleum distillates which can damage asphalt or black top parking lot surfaces.

In the preferred embodiment, the body member 10 is made of an elastomer. The preferred elastomers are uncured tire tread rubber. In one application, tire treads which were over age for a tire application but were suitable for the body member 10 were purchased, molded, and cured into the body member 10. In addition to providing excellent performance, this provides a further benefit of recycling material otherwise destined for a landfill.

In another preferred embodiment, the body member 10 is made of a material utilizing recycled shredded tires. Preferably the recycled tire material comprises about 60% shredded tires and some sort of bonding agent. A preferred source of such recycled shredded tires is sold under the trade name Tire Cycle and is available from Goldsmith and Eagleton of Wadsworth, Ohio.

Figure 5:
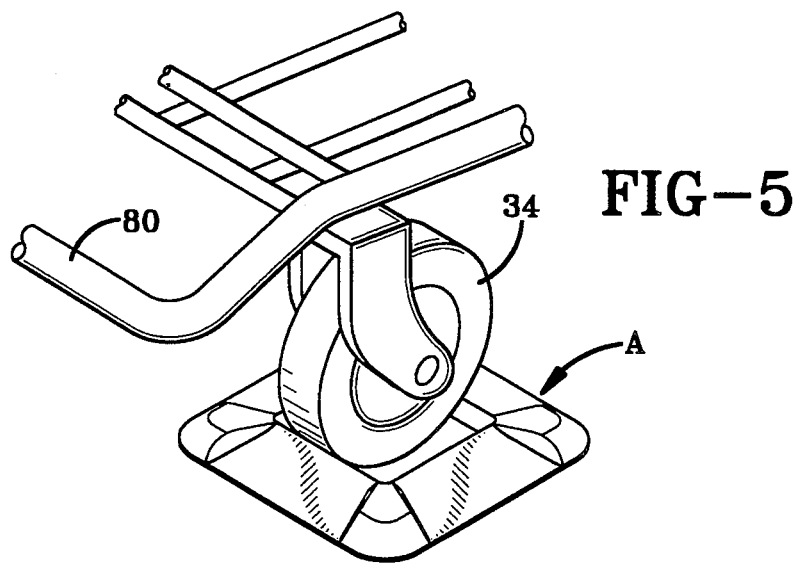
FIG. 5 is an enlarged perspective elevational view of the inventive apparatus used in conjunction with an associated wheeled shopping cart.
Figure 6:
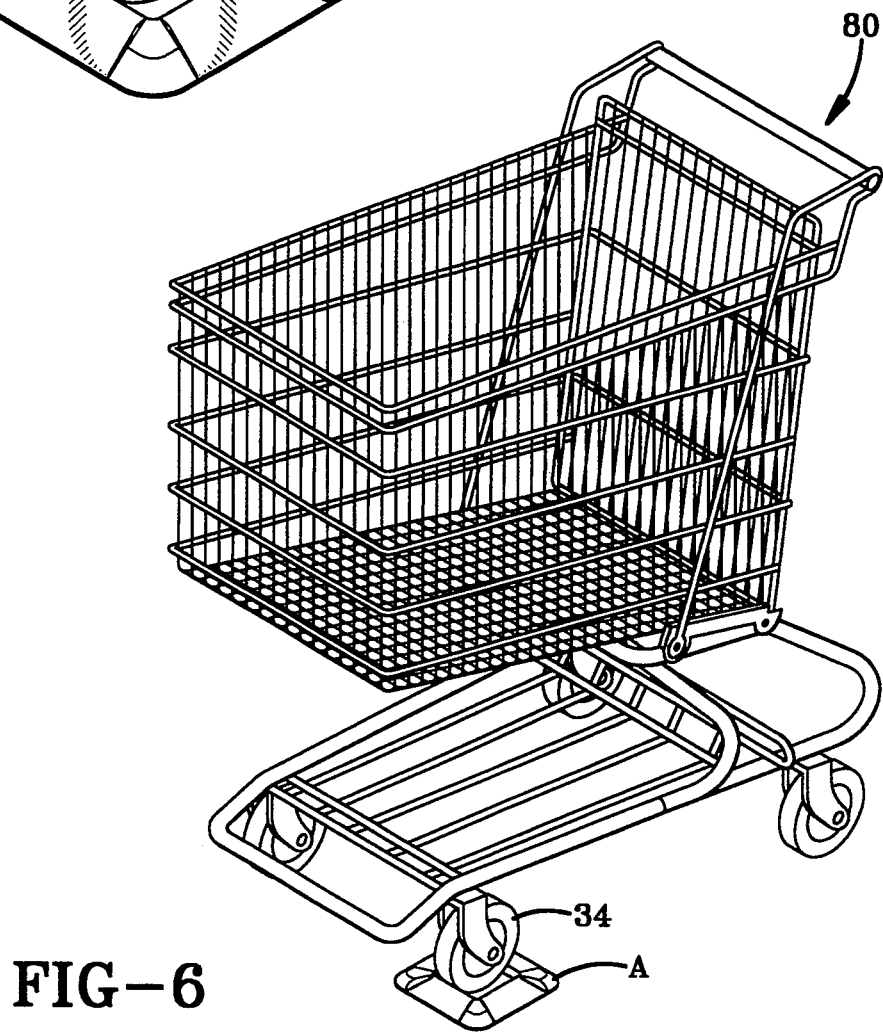
FIG. 6 is an elevational view of the inventive apparatus used for the wheeled shopping cart.
Figure 7:
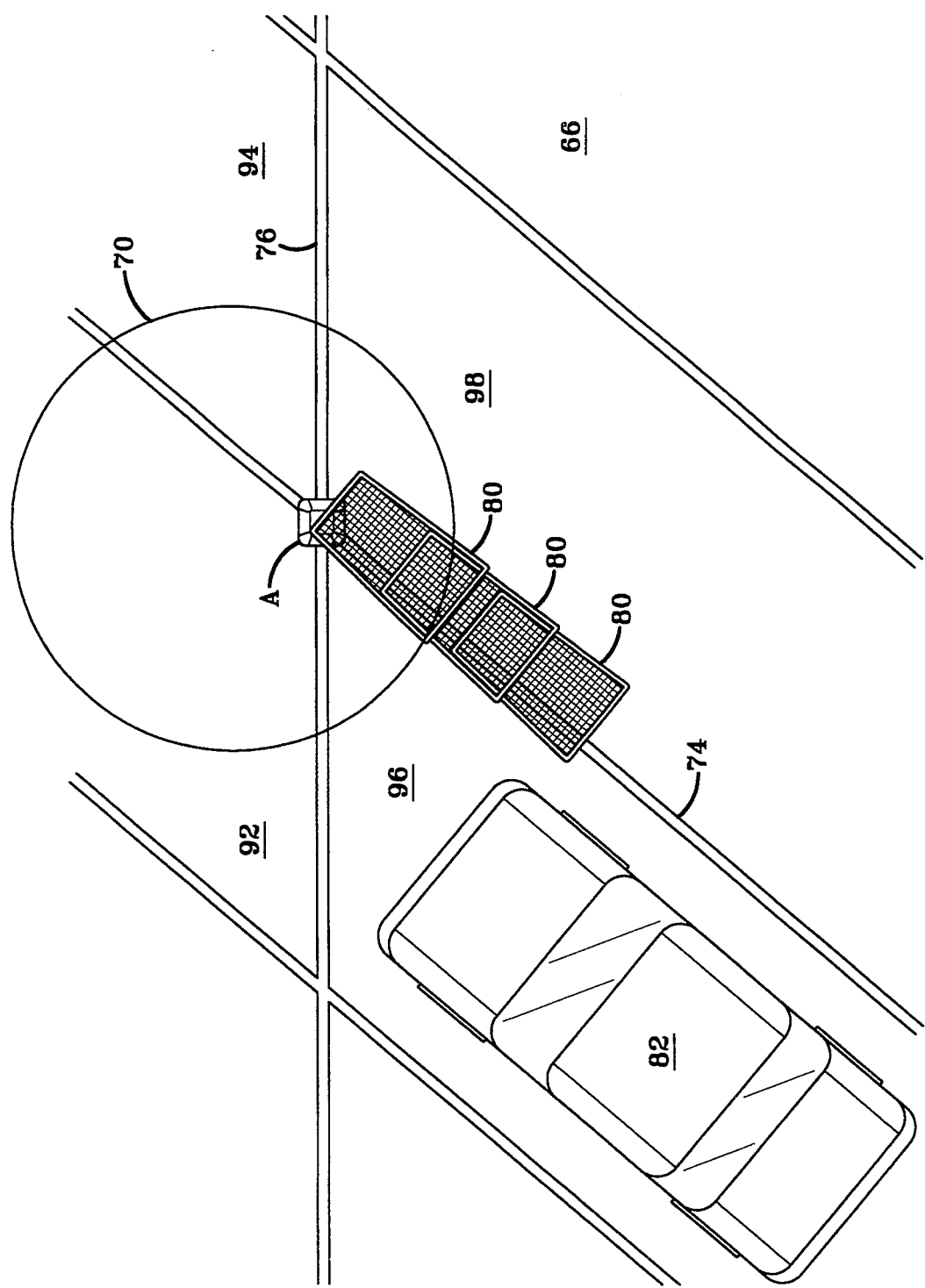
FIG. 7 is an elevational view of the inventive apparatus used in its environment of a parking lot.

The preferred method of utilizing the inventive apparatus is disclosed in FIG. 7. Once an appropriate location for securing shopping carts is chosen, the apparatus A is secured to the parking lot surface 66 via the securing means. One preferred arrangement of the apparatus A is a location indicated by circle 70 where two lines 74, 76 of the parking lot intersect, thereby creating four parking spaces 92, 94, 96, 98. If the apparatus A is placed in such a location as is shown in FIG. 7, at the intersection of lines 74,76, the user of shopping cart 80 can push the shopping carts 80 to their vehicle 82, unload the cart and secure one of the shopping cart's wheels 34 within the depression 40 of the apparatus A as is indicated in FIGS. 5 and 6. The wheel 34 is locked into the depression 40 by vertically downwardly extending depression side wall 44 and is kept within the depression 40 until lifted out thereof by someone wishing to remove the cart from the apparatus A.

As indicated in FIG. 7, multiple carts 80 can be secured through the use of a single apparatus A by stacking the carts 80 together along a line. Since most shopping carts 80 are designed to be stacked or grouped together in some space-saving way, the apparatus A utilizes the stackability of the carts 80 by allowing them to be arranged along a line (such as line 74 in FIG. 7) and be secured by the use of a single apparatus A practice, as many as eleven carts 80 have been successfully secured by a single apparatus A.

In another embodiment, the apparatus A and depression 40 are made large enough so that wheels 34 of several shopping carts 80 can be secured within a single depression 40. In this embodiment, a single apparatus A would be required at the intersection of lines 74, 76.

Figure 8:
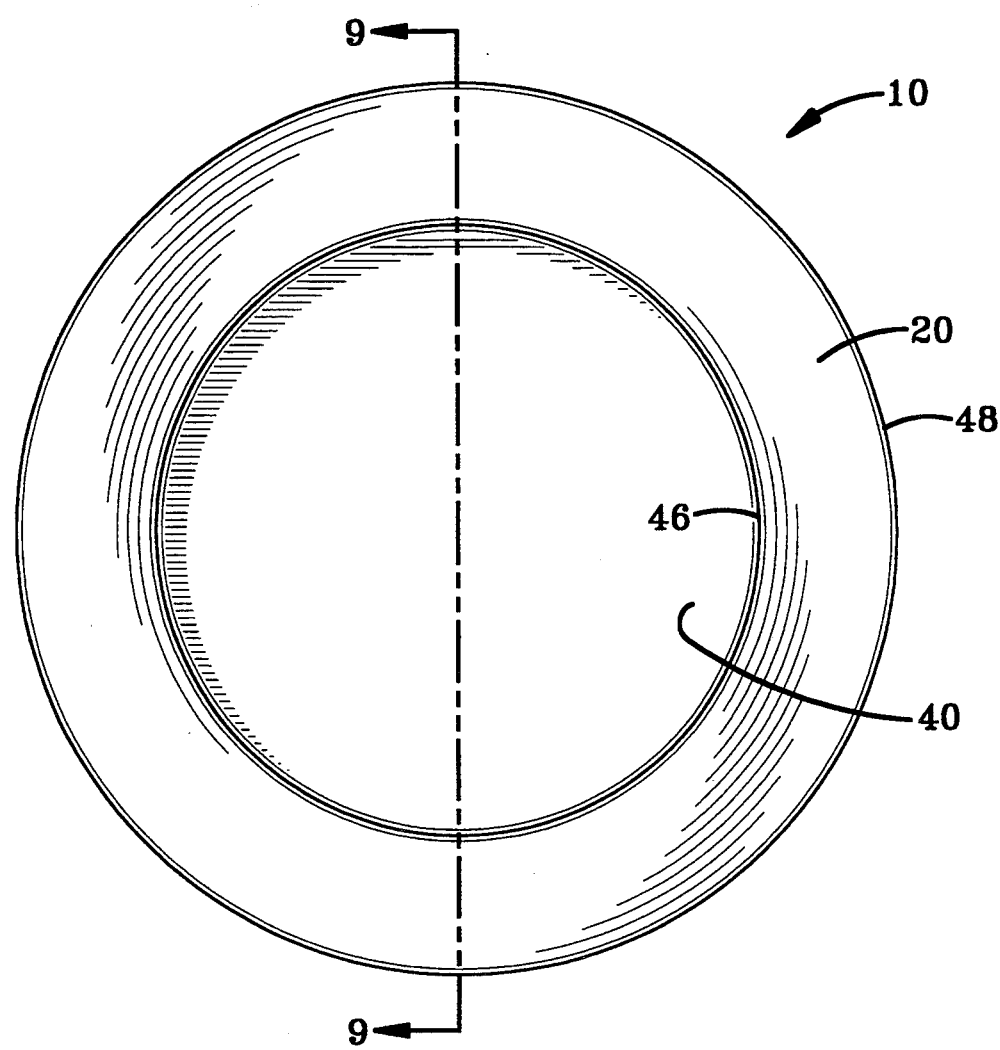
FIG. 8 is a top view of an apparatus according to an alternate embodiment of the invention; and, FIG. 9 is a cross-sectional view of the alternate embodiment of FIG. 8, taken along line 9—9 of FIG. 8.
Figure 9:
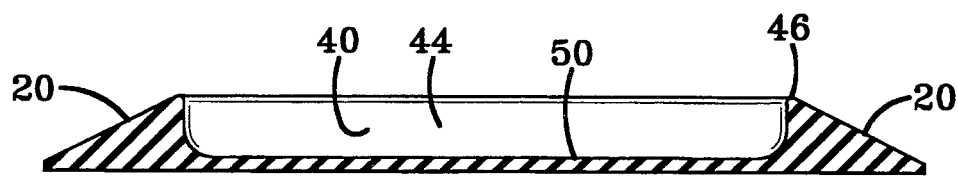

With reference to FIGS. 8 and 9, an alternate embodiment of the invention is shown. In this embodiment, the body member 10 is configured into a round shape. The body mender 10 still features inclined surfaces 20, a top edge 46, an outside edge 48, a depression 40, and depression floor 50. All other aspects of the invention are essentially the same with exception of the corner shoulders 26. In the embodiment shown in FIGS. 8 and 9, there are no corner shoulders 26 since there are no corners. The embodiment shown in FIGS. 8 and 9 may have advantage in some applications since a wheel 34 of a shopping cart 80 can enter the depression 40 from any direction.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus for securing a wheeled cart to a specific location, said apparatus comprising:
   a body member, said body member having a top surface and a bottom surface, said top surface having an outside edge, a top edge and an inclined surface, said inclined surface extending between said outside edge and said top edge of said top surface, said inclined surface and said top edge of said top surface defining a depression; and,
   a corner shoulder, said corner shoulder having an outward-facing surface, said corner shoulder being located on said inclined surface and being elevated therefrom.

2. The apparatus of claim 1 wherein said outward-facing surface of said corner shoulder is rounded.

3. The apparatus of claim 2 wherein said outward-facing surface of said corner shoulder is rounded to a radius of between 1 inch and 3 inches.

4. An apparatus for securing a shopping cart to a specific location within a parking lot, thereby preventing unmanned carts from rolling into and damaging cars parked in the parking lot, said apparatus comprising:
   a body member, said body member being made of an elastomeric material and having a top surface and a bottom surface, said top surface having an outside edge and a top edge;
   an inclined surface, said inclined surface being located in said top surface of said body member and extending between said outside edge and said top edge of said top surface, said inclined surface making an angle of between 10 degrees and 75 degrees with a plane containing said bottom surface of said body member;
   depression side walls, said depression side walls being located in said top surface of said body member and extending vertically downwardly from said top edge of said top surface, said depression side walls having a height suitable for retaining wheels of associated shopping carts therewithin;
   a depression, said depression being located in said top surface of said body member and being defined by said depression side walls, said depression having dimensions suitable for selectively receiving wheels of associated shopping cares;
   corner shoulders, said corner shoulders rising from and extending above said inclined surfaces, said corner shoulders adapted for directing wheels of associated shopping carts between said corner shoulders and up said inclined surfaces, said corner shoulders having outwardly-facing surfaces, said outwardly-facing surfaces being rounded; and,
   adhesive, said adhesive attached to said bottom surface of said body member, said adhesive being butyl rubber mastic adhesive.

* * * * *